(12) United States Patent
Almanza-Workman et al.

(10) Patent No.: US 9,682,886 B1
(45) Date of Patent: Jun. 20, 2017

(54) INK COATING APPLICATION SYSTEM AND METHOD

(71) Applicant: Amazon Technologies, Inc., Reno, NV (US)

(72) Inventors: Angeles Marcia Almanza-Workman, Sunnyvale, CA (US); Shan Cheng, Los Altos, CA (US); Gregory Turner Witmer, Mountain View, CA (US); Yean Chan Woon, Singapore (SG); Keith Ho Soo Suan, Singapore (SG)

(73) Assignee: AMAZON TECHNOLOGIES, INC., Reno, NV (US)

( * ) Notice: Subject to any disclaimer, the term of this patent is extended or adjusted under 35 U.S.C. 154(b) by 200 days.

(21) Appl. No.: 14/307,358

(22) Filed: Jun. 17, 2014

(51) Int. Cl.
*C03C 17/00* (2006.01)

(52) U.S. Cl.
CPC .................................. *C03C 17/002* (2013.01)

(58) Field of Classification Search
CPC .................................................... C03C 17/002
See application file for complete search history.

(56) References Cited

U.S. PATENT DOCUMENTS

| | | | |
|---|---|---|---|
| 3,400,998 A | 9/1968 | Daugherty et al. | |
| 3,881,828 A | 5/1975 | Jones | |
| 4,024,096 A | 5/1977 | Wachtel | |
| 4,119,756 A | 10/1978 | Midorikawa | |
| 4,157,874 A * | 6/1979 | Durand | B43K 5/1845 101/470 |
| 4,222,925 A * | 9/1980 | Bryant | C09J 175/04 524/589 |
| 4,525,215 A * | 6/1985 | Shioi | C09D 11/16 106/31.4 |
| 4,545,819 A | 10/1985 | Shioi et al. | |
| 4,654,067 A | 3/1987 | Ramus et al. | |
| 4,793,041 A | 12/1988 | Jenkins et al. | |
| 4,838,723 A | 6/1989 | Suzuki et al. | |
| 4,873,399 A | 10/1989 | Landmeier | |
| 5,308,135 A * | 5/1994 | Stedman | B60J 1/005 296/201 |
| 5,316,169 A | 5/1994 | Gallagher | |
| 5,480,250 A | 1/1996 | Birden | |
| 5,518,535 A | 5/1996 | Boaz | |
| 5,545,277 A * | 8/1996 | Hashemi | B28D 1/00 156/106 |
| 5,672,021 A | 9/1997 | Abber et al. | |
| 5,727,893 A | 3/1998 | Handler | |
| 5,770,325 A | 6/1998 | Keller et al. | |
| 5,811,485 A | 9/1998 | Charnock et al. | |
| 5,938,360 A | 8/1999 | Yen et al. | |
| 6,090,451 A * | 7/2000 | Barth et al. | B05C 17/002 401/138 |
| 6,224,284 B1 | 5/2001 | Sukhna et al. | |
| 6,322,268 B1 | 11/2001 | Kaufmann et al. | |

(Continued)

*Primary Examiner* — James M Mellott
(74) *Attorney, Agent, or Firm* — K&L Gates LLP (57) ABSTRACT

A side surface of a cover glass of an electronic device may be coated with a curable ink to reduce leakage of light from the side surface. The ink may be deposited on the side surface via a pen comprising a reservoir, a valve, and a nib. The nib may comprise a fiber bundle through which pigment particles may pass. The ink may be precisely deposited via the nib on the side surface without visible ink overflowing to a front surface or a back surface of the cover glass.

22 Claims, 7 Drawing Sheets

(56) References Cited

U.S. PATENT DOCUMENTS

| | | |
|---|---|---|
| 6,328,040 B1 | 12/2001 | Stein |
| 6,488,429 B2 | 12/2002 | Korper |
| 6,561,713 B2 | 5/2003 | Sukhna et al. |
| 7,084,191 B2 | 8/2006 | Mammen et al. |
| 7,135,507 B2 | 11/2006 | Sexton |
| 7,290,955 B2 | 11/2007 | Patel et al. |
| 7,607,848 B1 | 10/2009 | Ahmed et al. |
| 8,376,644 B2 | 2/2013 | Schwarz et al. |
| 8,617,646 B2 | 12/2013 | Sexton |
| 8,643,260 B1 | 2/2014 | Nemeth et al. |
| 8,684,617 B2 | 4/2014 | Koyama |
| 2001/0003566 A1 | 6/2001 | Yoshida et al. |
| 2008/0219746 A1 | 9/2008 | Lee et al. |
| 2008/0269452 A1* | 10/2008 | Schwoeppe et al. .. C08G 18/10 528/28 |
| 2009/0110843 A1 | 4/2009 | Halahmi et al. |
| 2009/0286049 A1 | 11/2009 | McFarland et al. |
| 2011/0216494 A1* | 9/2011 | Gotham et al. .......... H05K 5/02 361/679.21 |
| 2012/0149811 A1 | 6/2012 | Chamberlain et al. |
| 2013/0108797 A1* | 5/2013 | Rapin et al. ............. B05D 1/40 427/429 |
| 2013/0224391 A1* | 8/2013 | Ash et al. ................ B05D 1/28 427/429 |
| 2014/0093709 A1 | 4/2014 | Toyoda et al. |
| 2014/0119807 A1 | 5/2014 | Tarlow et al. |
| 2015/0259465 A1* | 9/2015 | Burckhardt et al. ... C08G 18/10 428/423.1 |

* cited by examiner

INK COATING APPLICATION SYSTEM AND METHOD

BACKGROUND

Many electronic devices, such as tablet computers, electronic book readers, smartphones, and other mobile computing devices, include a protective cover glass through which an image generated by a graphical display component may be viewed. A housing of electronic devices often includes a bezel to frame and protect the edges of a cover glass, such that each edge surface of the cover glass may be positioned underneath the bezel. In order to increase the surface area of the cover glass visible to a user, it is desirable to narrow the bezel surrounding the cover glass and to expose much if not all of the cover glass to the user by placing an edge of the cover glass flush with the bezel so that portions of the bezel do not overhang the front surface of the cover glass. In some cases, the bezel may be eliminated, and the cover glass may be adhered directly on top of side edges of the housing. However, because light travels from the graphical display through the cover glass, light may leak or be reflected through the side surface of the cover glass in an undesirable way.

Accordingly, there is a need to improve the suppression of the leakage of light from the side surfaces of a cover glass.

DETAILED DESCRIPTION

In the following description, reference is made to the accompanying drawings which illustrate several embodiments of the present disclosure. It is to be understood that other embodiments may be utilized and system or process changes may be made without departing from the spirit and scope of the present disclosure. The following detailed description is not to be taken in a limiting sense, and the scope of the embodiments of the present invention is defined only by the claims of the issued patent. It is to be understood that drawings are not necessarily drawn to scale.

Figure 1:
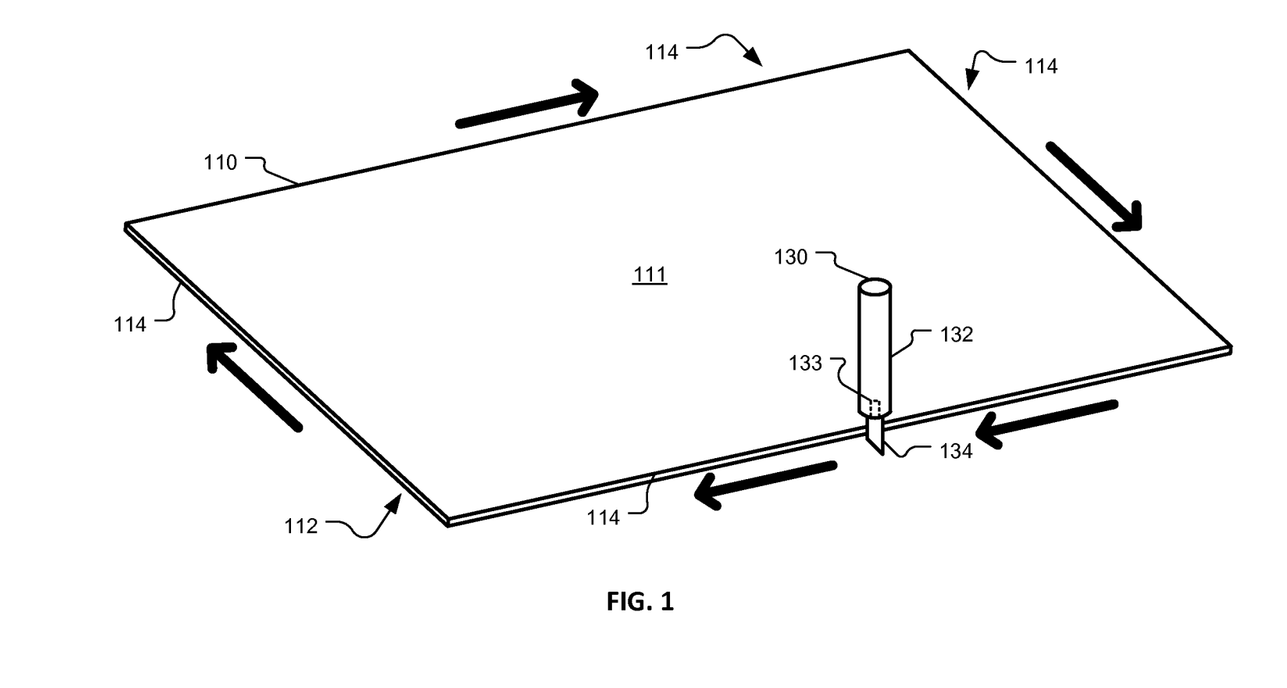
FIG. 1 is a block diagram illustrating an example perspective view of a cover glass and a pen, in accordance with embodiments of the present invention.

FIG. 1 is a block diagram illustrating an example perspective view of a cover glass 110 and a pen 130, in accordance with embodiments of the present invention. The cover glass 110 may comprise one or more layers of glass (e.g. toughened glass, borosilicate glass, etc.), plastic (e.g., polycarbonate, polymethyl methacrylate, etc.), composite, inorganic material (e.g., sapphire, etc.), or other substrate or laminates constituted from a transparent or semi-transparent material. The cover glass 110 may have a front surface 111, an opposing back surface 112, and four side surfaces 114 that are between the front surface 111 and the back surface 112. As shown in FIG. 1, the four side surfaces 114 may represent the circumference of the cover glass 110 and may define a thickness of the cover glass 110. Although the cover glass 110 is illustrated with a rectangular shape in FIG. 1, it is to be understood that the cover glass 110 may have any desirable shape such as an oval.

The side surface 114 of the cover glass 110 may be coated with an ink, such as a curable ink, a reactive ink, a thermoset ink, an unreactive ink, a thermoplastic ink, or the like. As illustrated in FIG. 1, a layer of ink may be applied by the pen 130, such as a marker, an ink system, or the like. The pen 130 may comprise a reservoir 132, or a barrel, that contains the ink and a nib 134 that delivers the ink to the side surface 114. Under some embodiments, the pen 130 may comprise a valve 133, or a conduit portion, that is in fluid communication with the reservoir 132 and the nib 134. The valve 133 may provide sealable access to the reservoir 132, and ink may be accessed or released via a valve actuator that may respond to pressure. For example, ink may flow from the reservoir 132 to the nib 134 when pressure is applied to the nib 134, such as by pressing the nib 134 against a resistive surface. It is to be understood that the valve 133 may be chosen based on the viscosity of the ink. For example, the valve 133 may permit enough ink to saturate the nib without smearing or smudging of the ink when applied to a receiving surface.

The reservoir 132 may be an ink storage component, an ink dispensing component, an ink mixing component, a liquid container, or the like. The reservoir 132 may have a hollow body that defines an enclosed volume with an opening at one end through which ink may be filled or refilled, and through which ink may flow towards the nib 134.

The nib 134 may comprise a plurality of fibers forming a fiber bundle that may be rigid. The plurality of fibers may consist of an acrylic material, a polyester material, a synthetic material, a natural material, or the like. Under some embodiments, the fiber bundle may have increased abrasion resistance and increased deformation resistance to facilitate repeatedly being applied to glass surfaces. The plurality of fibers may be aligned longitudinally. Under some embodiments, the plurality of fibers may have an arrangement that is substantially linear, substantially parallel, or unidirectional. Under some embodiments, the plurality of fibers may be twisted or kinked. It is to be understood that under some embodiments, the nib 134 may comprise a capillary material.

The nib 134 may be porous, permeable, or impregnable with respect to the ink. The fiber bundle may comprise channels, voids, passages, pours, capillaries, or the like, which may be elongated in the direction of ink flow. The size of such may depend on the number of fibers and the width of fibers in the fiber bundle. In some embodiments, ink may flow between the plurality of fibers. The nib 134 may deliver, meter out, dispense, or deposit ink onto at least one side surface 114 of the cover glass 110, or other ink receiving surfaces such as a substrate. As shown in FIG. 1, arrows indicate that ink may be delivered around the circumference or perimeter of the cover glass.

Figure 2A:
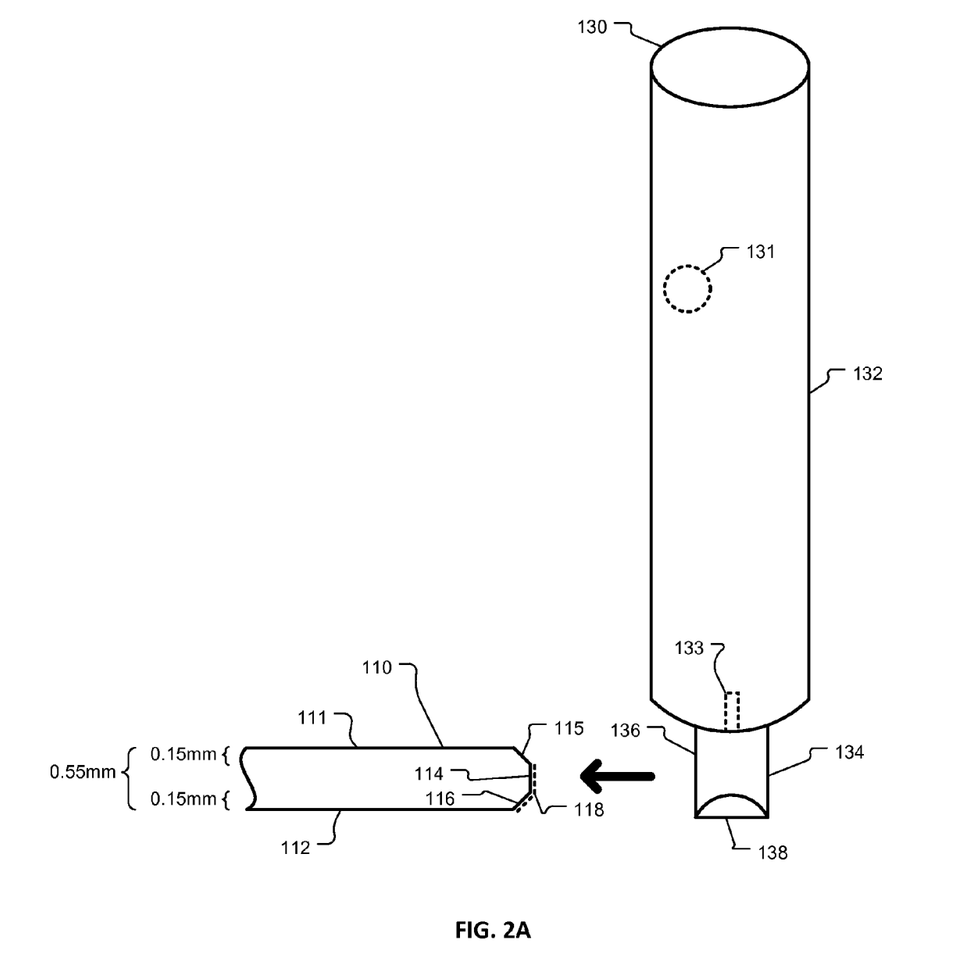
FIGS. 2A-2B are block diagrams illustrating example side views of a portion of a cover glass and a pen, in accordance with embodiments of the present invention.
Figure 2B:
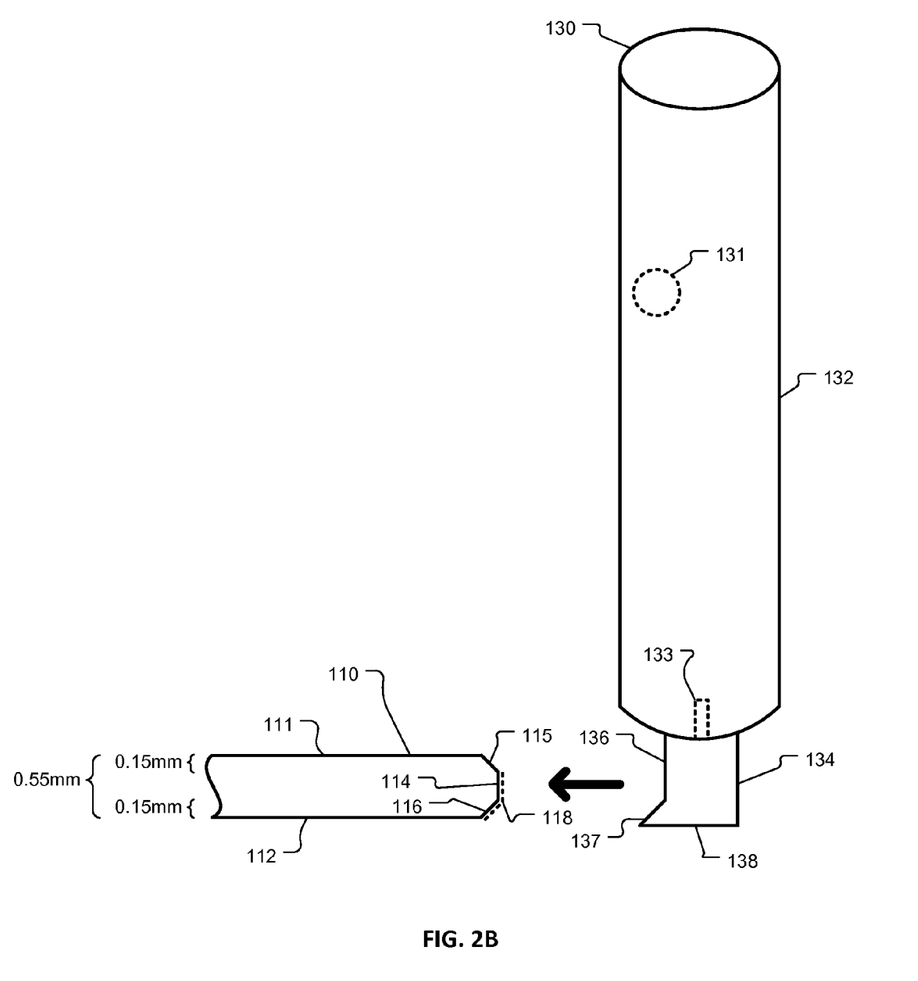

As shown in FIG. 2A, the nib 134 may comprise a body 136 and a tip 138. The tip may have a shape such as a chisel, a bullet, an angled cylinder, a rectangle, or the like. The cover glass 110 may comprise a front surface 111, an opposing back surface 112, and a side surface 114 that is between the front surface 111 and the back surface 112. The side surface 114 may define a thickness of the cover glass. Under some embodiments, ink may be delivered to the side surface 114 via the tip 138, in which the pen is held in a parallel position in relation to the front surface 111 of the cover glass 110. In other embodiments, ink may be delivered to the side surface 114 via the body 136 or the side surface of the nib 134, in which the pen is held in a perpendicular position in relation to the front surface 111 of the cover glass 110, as shown in FIG. 1. As shown in FIG. 2B, the nib 134 may have one or more protrusions 137 or indentations (not shown) that facilitate delivery of ink to an uneven or nonplanar side surface 114 of the cover glass 110.

The ink may be a curable ink, a thermoset ink, or the like. The curable ink may be advantageous because, after curing, it may be resistant to cleaning solvents, it may have strong adherence to the side surface 114 of the cover glass 110, and it may be resistant to abrasions and scratches. Under some embodiments, the thermoset ink may have a formulation of a resin carrying a pigment, a catalyst to assist with curing of the resin, an adhesion promoter to assist with adhering the ink to the side surface 114 of the cover glass 110, and a solvent to assist with sufficient viscosity of the ink. Under some embodiments, the solvent may be formulated with an evaporation rate that balances a slow evaporation rate when the ink passes through the nib 134 with a fast evaporation rate when the ink is deposited on the side surface 114 of the cover glass 110. Reduced evaporation of the solvent in the nib may be beneficial to decrease clogging of the nib 134, while increased evaporation of the solvent deposited on the cover glass may be beneficial to reduce overflow of the ink from the side surface 114 of the cover glass 110. It is to be understood that the curable ink may comprise a variety of additives, for example, the curable ink may be formulated for ultraviolet curing.

The resin may be a visually clear material, such as epoxy, polyurethane, polyester, UV curable acrylate, or the like. The carried pigment may comprise carbon black or encapsulated carbon black to assist with the opacity of the ink. In other embodiments, the pigment may have color to correlate with the color of the cover glass 110 or the color of a component coupled to the cover glass 110, and the pigment may be comprised of a heavy metal, a metal oxide, an inorganic chemical, an organic material, a carbon material, or the like. It is to be understood that the resin may carry a colorant comprising the pigment. It is to be understood that the colorant may also comprise a plurality of pigments or a combination of pigment and soluble dye. Under some embodiments, a particle size or mean particle width of the pigment may be from about 0.1 micrometers (microns) to about 30 microns. Under some embodiments, a particle size or mean width of the pigment may be about 3 microns. Under alternative embodiments, a particle size or mean width may be about 0.1 microns (i.e., 100 nanometers).

The nib 134 may be chosen to match an ink formulation. For example, the nib 134 may be chosen based on the material of the nib 134 being compatible with a solvent of the ink. For example, a material of a nib may be resistant to a solvent, such as resistance to degradation. The nib 134 may also be chosen to promote flow or penetration of a substantial volume of pigment through the fiber bundle, such as through the passages between at least two fibers of the plurality of fibers. For example, a particle of the pigment may permeate longitudinally through the fiber bundle. For further example, a mean width of particles of the pigment may generally be less than a mean width of the passages of the fiber bundle. Such may prevent clogging or blocking of the nib 134 by the particles of the pigment. Furthermore, allowing pigment particles to generally pass through the nib 134 may improve the opacity of the ink delivered to a receiving surface.

The nib 134 may also be chosen based on the viscosity of the ink. For example, the passages of the fiber bundle may be configured to provide a precise distribution of ink through the nib 134. Under some embodiments, when the nib 134 is drawn across a receiving surface, such as the side surface 114, the ink may remain substantially stationary in the area of application of the receiving surface. Under such an embodiment, there may be no visible overflow of ink from the side surface 114 to the front surface 111 or to the back surface 112 of the cover glass 110. In some embodiments, when the ink is precisely delivered to the side surface 114 via the nib 134, the front surface 111 may be visibly free or clear of the ink.

FIG. 2A is a block diagram illustrating an example side view of a portion of the cover glass 110 and the pen 130, in accordance with embodiments of the present invention. Similar to FIG. 1, the pen 130 may comprise the reservoir 132, the valve 133, and the nib 134. The nib 134 may comprise a body 136 that is fluidly coupled to the valve 133, and a tip 138 that is at a distal end of the body 136. The reservoir 132 may include one or more balls 131, such as a carbon steel ball or ball bearing. The ball 131 may agitate or stir the ink in the reservoir 132 when the pen 130 is shaken or rotated one hundred eighty degrees. For example, to agitate the ink, the ball may roll from a first end of the reservoir 132 to a second end, and back to the first end.

Similar to FIG. 1, the cover glass 110 may include the front surface 111, the back surface 112 opposed to the front surface 111, and the side surface 114 that is between the front surface 111 and the back surface 112. Under some embodiments, the cover glass 110 may include one or more chamfers, which may provide additional strength to the cover glass 110. A chamfer may have an angle with respect to the front or back surface 111,112 from about 30 degrees to about 45 degrees. As illustrated in FIG. 2A, the cover glass 110 may include a first chamfer surface 115 that is between the side surface 114 and the front surface 111, and a second chamfer surface 116 that is between the side surface 114 and the back surface 112.

Under some embodiments, a surface of the body 136 of the nib 134 may be positioned in fluid contact with the side surface 114, and the nib 134 may be translated around the circumference of the cover glass 110. In some embodiments, a layer of ink 118 may be deposited on the side surface 114 and the second chamfer surface 116. For example, the nib may be translated twice around the circumference of the cover glass 110, the first translation with the nib at an angle associated with the side surface 114 and the second translation with the nib at an angle associated with the second chamfer surface 116. In addition, in some embodiments, ink may overflow from the side surface 114 to the first chamfer surface 115, and ink may overflow from the second chamfer surface 116 to the back surface 112. Under some embodiments, ink does not overflow or get deposited to the front surface 111, as such may introduce a cosmetic flaw to the cover glass 110.

As illustrated in FIG. 2B, the nib 134 may have a protrusion 137 that has a shape that corresponds to the shape of the second chamfer surface 116, to facilitate delivery of ink to the second chamfer surface 116. Such may be advantageous to reduce the number of times that the nib may be translated around the circumference of the cover glass 110, for example, one translation around.

Under some embodiments, it may be desirable to deposit ink on the side surface 114, the second chamfer surface 116, as well as the first chamfer surface 115. Under this embodiment, the nib 134 may comprise a conformable or flexible material that conforms to the shape of the surface on which ink is to be deposited. For example, when the body 136 of the nib is pressed against the side surface 114 of the cover glass 110, the body 136 may become indented against the side surface 114 and may also come into contact with the first chamfer surface 115 and the second chamfer surface 116. Under this embodiment, the nib 134 may be translated once around the circumference of the cover glass 110 to deposit ink on the side surface 114, the first chamfer 115, and the second chamfer 116.

Under some embodiments, the vertical height of the cover glass 110 may be less than about 0.8 millimeters. For example, the cover glass 110 may have a vertical height of about 0.55 millimeters or about 0.7 millimeters, and the vertical height of each chamfer associated with the first and second chamfer surfaces 115,116 may be from about 0.10 to about 0.15 millimeters. It is to be understood that the vertical height of the cover glass and the chamfers may be any acceptable height, and the heights provided are for illustrative purposes.

Under some embodiments, the layer of ink 118 may be deposited precisely by the nib 134, such that, after curing the ink, an acceptable optical density and thickness of the layer of ink 118 is achieved. It may be advantageous to have a high optical density of the layer of ink 118 in order to reduce light leakage from a coated surface, such as the side surface 114. For example, an optical density may be 3.5 or greater. Under some embodiments, an optical density may be 5 or greater. Opacity may also be measured by a ratio of an optical density over a thickness of the layer of ink 118, in which a higher ratio is preferred. For example, if the optical density of the layer of ink 118 is 4.61 and the thickness of the layer of ink 118 is 6.2 microns, then the ratio is 0.74. High opacity may be achieved by the nib 134 allowing pigments of the ink to pass through the nib 134 and not be blocked, clogged, or filtered by the nib 134. It also may be advantageous to have a reduced and uniform thickness of the layer of ink 118 to reduce manufacturing tolerances between the cover glass 110 and other components, such as a housing of an electronic device. It is to be understood that curing the ink may also improve the durability of the layer of ink 118 with respect to normal production line handling and cleaning with solvents.

Figure 3:
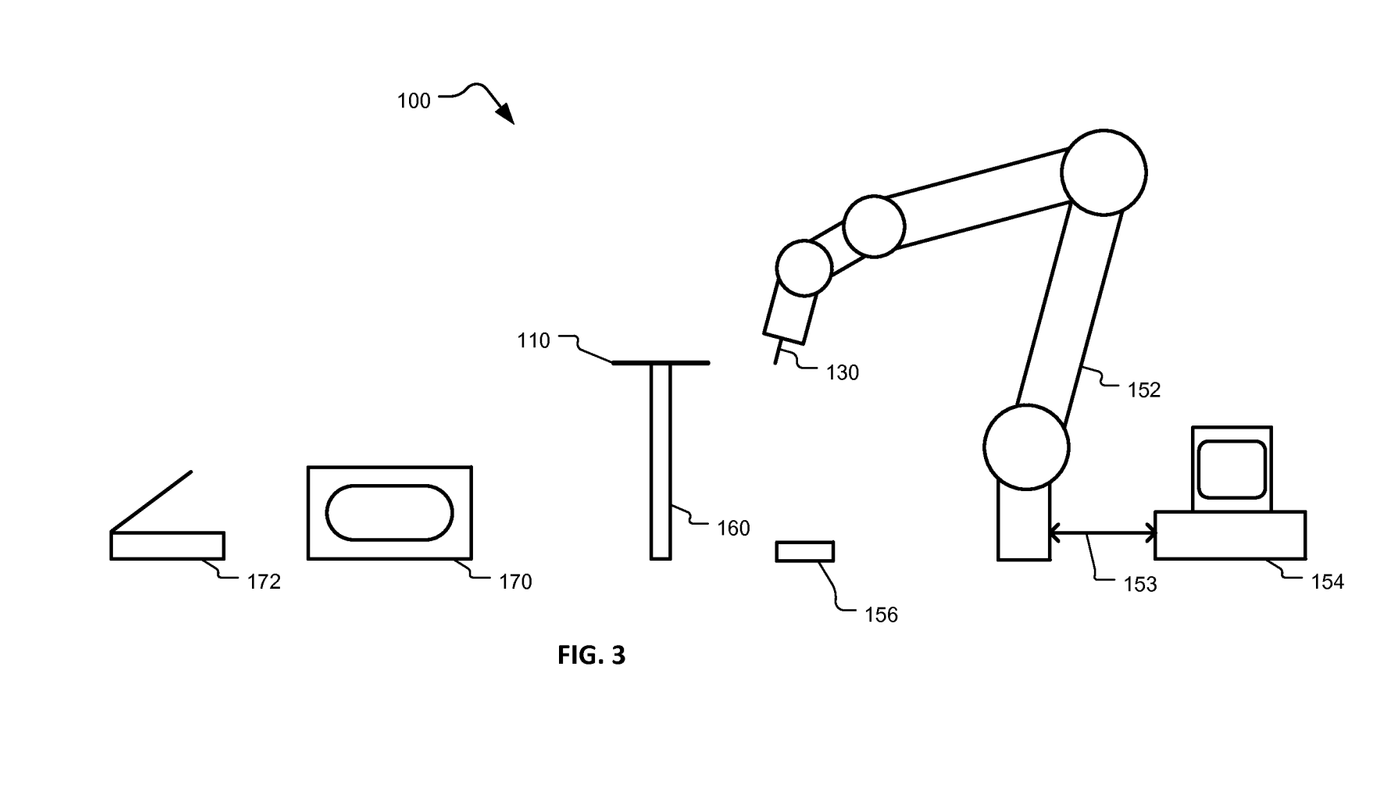
FIG. 3 is a block diagram illustrating an ink coating application system, in accordance with embodiments of the present invention.

FIG. 3 is a block diagram illustrating an ink coating application system 100, in accordance with embodiments of the present invention. The system 100 may include a mount 160 for supporting the cover glass 110, a positioning system 152 for positioning the pen 130, a programmer 154, a curing station 170, and an inspection station 172. The positioning system 152 may be a robotic arm with five or six axes. The positioning system 152 may be configured to hold the pen 130 perpendicular to the front surface 111 of the cover glass 110 and translate the nib 134 of the pen 130 around the circumference of the cover glass 110. The positioning system 152 may be programmed by the programmer 154 that is communicatively coupled to the positioning system 152 via a program interface 153. The positioning system 152 may be programmed to agitate the ink in the pen 130. For example, the pen 130 may be rotated one hundred eighty degrees one or more times. For further example, the pen 130 may be shaken in an x-axis direction, a y-axis direction, a z-axis direction, or a combination of directions. It is to be understood that the positioning system 152 may be a user who may manually perform the actions or steps described herein with respect to the robotic arm.

In an alternative embodiment, the mount 160 may be an X-Y table that provides horizontal movement of the cover glass 110, and the positioning system 152 may be a pen holder that positions the nib 134 of the pen 130 perpendicular to the front surface 111 of the cover glass 110. Under such an embodiment, the pen 130 may be held in a stationary position, and the nib 134 of the pen 130 may be translated around the periphery of the cover glass by movement of the cover glass via the X-Y table around or alongside the nib 134. It is to be understood that the embodiments of the robotic arm or the X-Y table are not intended to be limiting. For example, both the cover glass 110 and the pen 130 may be moved in order to translate the nib 134 around the cover glass 110.

The positioning system 152 may also be programmed to prime the nib 134 with ink. For example, the positioning system 152 may provide for a stroke of the pen 130 in the z-axis direction that presses the nib 134 against a resistive surface, such as a priming station 156. Such a stroke of the pen 130 or depression of the nib 134 may be for a determined period of time, and may actuate the valve 133 of the pen 130 and release ink from the reservoir 132 to the nib 134. It is to be understood that the positioning system 152 may be programmed to perform more than one stroke of the pen to prime the nib 134 with a sufficient quantity of ink to coat the side surface 114 of the cover glass 110. It is also to be understood that the nib 134 may be primed before each application of ink to the side surfaces 114 of a plurality of cover glasses 110.

After the side surface 114 of the cover glass 110 is coated with the ink, the ink may be cured. For example, the cover glass 110 may be placed within or at the curing station 170 that may provide thermal, infrared, or ultraviolet curing. The curing station 170 may provide stationary curing or may provide mobile curing such as via a conveyor belt or a robotic arm. The curing station 170 may comprise an oven, an autoclave, an ultraviolet light source, or the like. In some embodiments of thermal curing, the ink may be cured at about 80 degrees Celsius for about 30 minutes. It is to be understood that such temperature and time for curing is exemplary. For example an alternative temperature may be about 50 degrees Celsius, and alternative curing times may be about 60 minutes and about 120 minutes. In some embodiments, the ink may be cured before the cover glass 110 is adhered to a graphical display, which may allow for a higher temperature for curing. In other embodiments, the ink may be cured after the cover glass 110 is adhered to the graphical display, and to prevent damage to the graphical display, a lower temperature may be provided in the curing process. In some embodiments of ultraviolet curing, the robotic arm, such as the positioning system 152, may direct ultraviolet light around the circumference of the cover glass 110. Under such an embodiment, the positioning system 152 may carry the pen 130 and an ultraviolet light source.

In some embodiments, the cover glass 110 may be inspected for light leakage at the inspection station 172. For example, the inspection station 172 may comprise a platform with a lid. The platform may comprise a light source, such as a strip of LED lights, that directs light to the cover glass 110. The cover glass 110 may be positioned between layers of soft material such as felt. The side surface 114 or an edge of the cover glass 110 may be exposed on the side of the inspection station 172 between the platform and the lid, and the cover glass may be visually inspected for light leakage.

Figure 4:
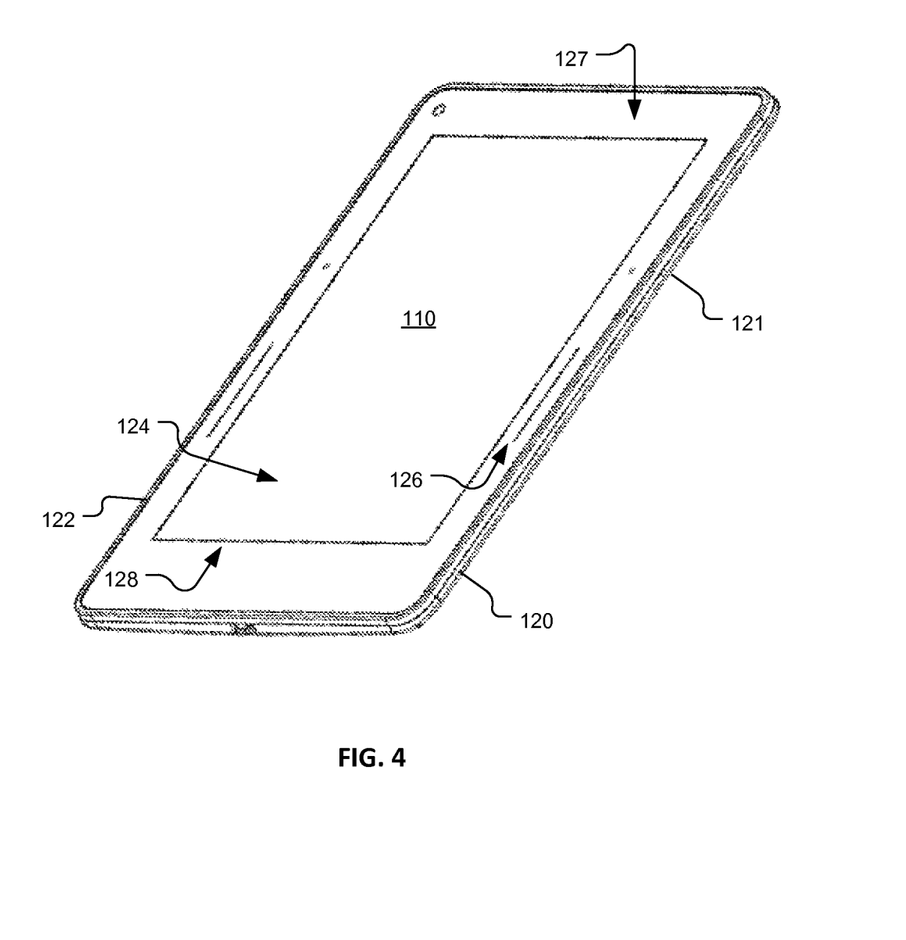
FIG. 4 is a perspective view of an electronic device with a cover glass, in accordance with embodiments of the present invention.

FIG. 4 is a perspective view of an electronic device 120 with a cover glass 110, in accordance with embodiments of the present invention. The cover glass 110 may be adhered to the housing 121. The graphical display 124 may be coupled to the cover glass 110, and a light source 128 may be coupled to the graphical display 124. Under some embodiments, the area of the graphical display 124 may be sized to match the cover glass 110, providing a borderless display (e.g., an edge-to-edge display). Under other embodiments, as illustrated in FIG. 4, the area of the graphical display 124 may be less than the cover glass 110, and an optional opaque mask 127 or border may be applied to the back surface 112 of the cover glass 110 to mask or block from view components of the electronic device that may otherwise be visible through the cover glass 112. Under some embodiments, the opaque mask 127 has a black color. Under other embodiments, the opaque mask 127 may have a decorative color to correspond or match nearby components, for example if an electronic device's housing is white then the opaque mask 127 may have a white color. The opaque mask 127 may comprise a dye having a color. Under some embodiments, the layer of ink 118 may comprise a pigment or dye having a similar or corresponding color to the color of the opaque mask 127. In some embodiments, a layer of ink on the side surface 114 of the cover glass 110 may prevent light leakage from light of the light source 128. A touch sensor 126 may be coupled to the cover glass 110. For example, the cover glass 110 may be a one-glass solution (OGS) cover glass. In some embodiments, the outer edge of the back surface 112 of the cover glass 110 may be coupled to the housing 121, and the housing may not have a bezel to protect the side surface 114 of the cover glass 110. In such an embodiment, a sealing ring 122 may encompass all or a portion of the side surface 114 of the cover glass 110. The sealing ring 122 may be comprised of a thermoplastic polyurethane (TPU) material, and may protect the side surface 114 from scratches, cracks, and other damage. It is to be understood that the layer of ink deposited on the side surface 114 of the cover glass 110 may prevent light from leaking between the side surface 114 of the cover glass 110 and the sealing ring 122.

It is to be appreciated that it may be advantageous to have a uniform and thin layer deposited onto the side surface 114 of the cover glass 110 to reduce manufacturing tolerances between components of the electronic device 120 that are coupled to the cover glass 110. It is also to be appreciated that ink that is inadvertently deposited or overflows onto the front surface 111 of the cover glass 110 may be considered a cosmetic defect when such ink is visible to a user of the electronic device 120. It is also to be appreciated that under some embodiments, the inadvertent deposit of ink or overflow of ink onto the back surface 112 of the cover glass 110 may introduce excessive manufacturing tolerance between the cover glass 110 and adhesives or components, such as the housing 121 of the electronic device.

Figure 5:
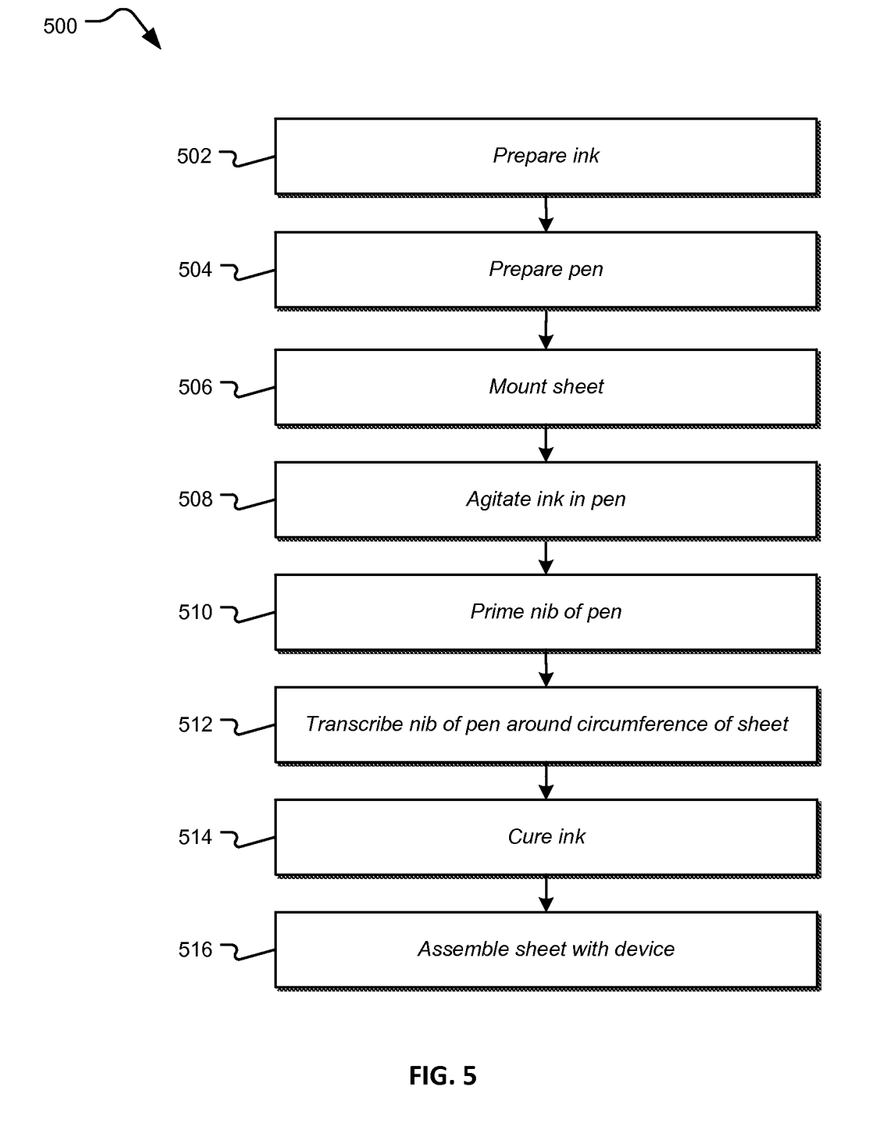
FIG. 5 illustrates an example flow diagram of a process of coating a cover glass, in accordance with embodiments of the present invention.

FIG. 5 illustrates an example flow diagram of a process 500 of coating the cover glass 110, in accordance with embodiments of the present invention. At step 502, ink may be prepared. For example, ink may be formulated from materials provided by Teikoku Printing Inks MFG. Co., LTD (Teikoku). For example, the ink may be formulated from a resin with a pigment, such as MRX HF-919 from Teikoku, a catalyst, such as 106 Catalyst from Teikoku, an adhesion promoter, such as GLS Glass Promoter from Teikoku, and a solvent such as G-002 Solvent from Teikoku. Under some embodiments, a resin and a solvent may be comprised of a respective polyester substance. The ink may be prepared by mixing 20 grams of a resin, 2 grams of a catalyst, 0.1 grams of an adhesion promoter, and 20 grams of a solvent. In some embodiments, the resin may be filtered for particles of the pigment that exceed a determined size, so that such excessively large particles may not clog or be blocked by the nib 134. For example, if the resin is expected to carry a pigment with a particle size of about 3 microns, then a filter may filter out pigment particles sized at about 30 microns or more.

At step 504, the pen 130 may be prepared. For example, components of the pen 130 may comprise the reservoir 132, such as 30210 Aluminum Barrel 9/16 inch from U-Mark, Inc., the valve 133, such as 30225 Standard White Valve from U-Mark, Inc., and the nib 134, such as 10300A Q10-P484-UBC Polyester High Flow 4.45 millimeter Bullet/Chisel Nib from U-Mark, Inc., with the bullet end acting as the tip 138 of the nib 134. The pen 130 may also include an optional cap, such as 30231 100-P Black Cap from U-Mark, Inc. The ink prepared in step 502 may be deposited in the reservoir 132. Furthermore one or more balls 131, such as 30241B 11/32 inch Carbon Steel Ball from U-Mark, Inc., may be deposited in the reservoir 132 to facilitate agitation of the ink. The prepared pen 130 may be coupled to the positioning system 152.

At step 506, the cover glass 110 may be mounted on the mount 160 that is adjacent to the positioning system 152. In some embodiments, the cover glass 110 may have previously been cut and polished before it is mounted.

At step 508, the positioning system 152 may agitate the ink in the pen 130. For example, the ink in the pen 130 may be agitated by shaking the pen 130 or rotating the pen 130 one hundred eighty degrees. Such agitation may be facilitated by the ball 131 within the reservoir 132.

At step 510, the nib 134 of the pen 130 may be primed with ink. For example, the positioning system 152 may depress or stroke the nib 134 against the priming station 156 to actuate the valve 133 of the pen 130. It is to be understood that the length of time of the depression, the amount of pressure of the depression and the quantity of depressions will be based on the amount of ink necessary to prime the nib 134 for application of ink to the side surface 114 of the cover glass 110.

At step 512, the positioning system 152 may translate the nib 134 of the pen 130 around the circumference of the cover glass 110, such that a layer of curable ink is deposited on the side surface 114 of the cover glass 110. For example, the pen may be moved from a first end of the side surface 114 to a second end of the side surface 114 in a longitudinal direction. Under some embodiments, as illustrated in FIG. 1, no visible ink is deposited or overflows to the front surface 111 or the back surface 112 of the cover glass 110. Under other embodiments, as illustrated in FIG. 2A, ink may be deposited on the second chamfer surface 116, and may overflow onto the first chamfer surface 115. In some embodiments, ink may overflow to the back surface 112, but not to the front surface 111.

At step 514, the deposited curable ink 118 may be cured. For example, the cover glass 110 may be cured in the curing station 170. In some embodiments, the curing may be induced by heat, ultraviolet light, infrared light, ambient air, or the like. It is to be understood that the curing step 118 may be optional when the ink is reactive, such as described below with respect to FIG. 6. In some embodiments, after the curable ink 118 is cured, the cover glass 110 may be inspected at the inspection station 172 for light leakage. At step 516, the cover glass 110 having the cured layer of ink 118 or an opaque coat may be coupled to a display component to form a display assembly. This display assembly may be coupled to a housing to form an electronic device 120.

Figure 6:
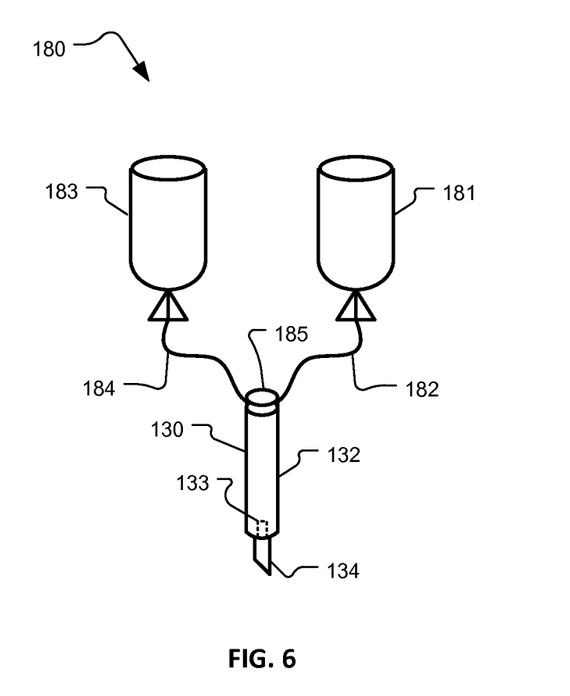
FIG. 6 is a block diagram illustrating an example perspective view of an ink delivery system, in accordance with embodiments of the present invention.

FIG. 6 is a block diagram illustrating an example perspective view of an ink delivery system 180, in accordance with embodiments of the present invention. FIG. 6 illustrates an alternative embodiment of the pen 130, in which the ink delivery system 180 feeds ink into the reservoir 132. The ink delivery system 180 may comprise a first pack 181, a first tube 182 coupled to the first pack 181, a second pack 183, and a second tube 184 coupled to the second pack 183. In some embodiments, the packs 181,183 may be containers, bottles, bags, reservoirs, or the like. The first pack 181 may contain a first composition that is capable of reacting with a second composition contained in the second pack 183, such as thermosetting compositions. For example, the first composition may comprise a resin and the second composition may comprise a catalyst that reacts with the resin. Under such an embodiment, the first composition may include a pigment, a solvent, and an adhesion promoter. Alternatively, the first composition may comprise a first resin and the second composition may comprise a second resin. Under such an embodiment, the first and second resins may react with each other. It is to be understood that although FIG. 6 illustrates two packs 181,183, under some embodiments there may be three or more packs. It is also to be understood that under some embodiments, the second pack 183 and the second tube 184 may be optional. For example, first pack 181 may contain a stable, unreactive, or thermoplastic composition, such as a UV-curable composition, that is fed to the pen 130 via the tube 182.

The first tube 182 and the second tube 184 may each be coupled to the pen 130 and may respectively feed the first and second composition to the pen 130. For example, the compositions may be fed to the reservoir 132 of the pen where the compositions are mixed together. Under some embodiments, the first and second tubes 182,184 may be coupled to an extruding component 185 that may extrude the first and second compositions into the reservoir 132. The extruding component 185 may be an extruder, a pump, a mixer, a blender or the like. It is to be understood that, although FIG. 6 illustrates the pen 130 comprising the extruding component 185, under some embodiments the ink delivery system 180 may comprise the extruding component 185, and the extruded compositions may be delivered to the pen 130 via a third tube. Under some embodiments, the ink in the reservoir 132 may comprise the homogenized or mixed first and second compositions, and the ink may flow from the reservoir 132 to the nib 134. Under some embodiments, the ink is applied to the cover glass 110 immediately after the ink flows to the nib 134, so that the first and second compositions of the ink react with each other on the cover glass 110 instead of within the nib 134. Under some embodiments, the delivery of the compositions to the nib 134 is regulated such that a predetermined ratio of the compositions is fed to the nib 134. Under some embodiments, the tubes 182,184 may have a line break, stop, switch, or the like to facilitate coupling the ink delivery system 180 to a second pen. Such may be beneficial if the mixed first and second compositions react quickly with each other within the nib 134 or the reservoir 132, requiring disposal of the nib 134 or the pen 130. It is to be understood that under some embodiments, reactive compositions may also be cured after reaction. For example, thermal curing may flash out or evaporate solvent of the ink.

Embodiments of the present invention may provide various advantages not provided by prior art systems. An exemplary advantage of some disclosed embodiments may be that light leakage or reflection may be reduced when a cover glass is coupled directly to a housing without a bezel to cover such light leakage. Another exemplary advantage of some disclosed embodiments may be the chemical strength and mechanical durability of the layer of ink that was cured after the ink was applied to the circumference of the cover glass. For example, it may be desirable to clean a cover glass with a cleaning solvent before assembling the cover glass to a housing of an electronic device, and the layer of ink may be resistant to such a cleaning solvent. Another exemplary advantage of some disclosed embodiments is the precise application of an ink via a nib of a pen to a side surface of a cover glass, such that the ink does not overflow to a front surface, which may cause a cosmetic defect of the cover glass. For example, a user of the electronic device may return an electronic device that has an ink layer on a portion of the front surface of the cover glass.

While the invention has been described in terms of particular embodiments and illustrative figures, those of ordinary skill in the art will recognize that the invention is not limited to the embodiments or figures described. Many of the embodiments described above in relation to a cover glass may be applied to filling micro cracks of a cover glass. For example, after a cover glass is cut or polished on a side surface, micro cracks may be introduced, and a curable ink may help to fill those micro cracks and add mechanical strength to the cover glass. Under this embodiment, a visibly clear or transparent ink may be used, for example, that does not contain a pigment. Furthermore, many of the embodiments described above in relation to a curable ink may also be applied to a curable liquid adhesive, such as a thermoset adhesive. For example, a reservoir 132 may be filled with the curable adhesive, and the adhesive may be applied to a thin receiving surface via the nib 134.

Although various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and, consequently, are not described in detail herein. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the processes, flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A method of manufacturing, the method comprising:
providing an electronic device cover glass substrate comprising a front surface, a back surface opposing the front surface, and at least one side surface between the front surface and the back surface, the at least one side surface having a first side surface end and a second side surface end longitudinally opposing the first side surface end;
positioning a pen at the first side surface end, the pen comprising:
a reservoir containing a curable ink comprising a pigment; and
a nib in fluid communication with the reservoir, the nib comprising a fiber bundle that permits the pigment to pass through the nib;
moving the pen in a longitudinal direction towards the second side surface end;
depositing a layer of the curable ink on the at least one side surface; and
curing the curable ink.

2. The method of claim 1, further comprising:
depositing a layer of the curable ink on a second chamfer surface of the electronic device cover glass substrate, wherein the second chamfer surface is between the at least one side surface and the back surface,
wherein the curable ink has a viscosity to facilitate overflow of ink from the at least one side surface to a first chamfer surface of the electronic device cover glass substrate, wherein the first chamfer surface is between the at least one side surface and the front surface.

3. The method of claim 1, wherein:
the pen comprises a valve coupled to the reservoir, wherein the valve comprises an actuator; and
the nib comprises a body coupled to the valve and a tip at the distal end of the body.

4. The method of claim 3, further comprising:
supporting the electronic device cover glass substrate with a mount;
actuating the valve to release a portion of the curable ink from the reservoir to the nib; and
translating the body of the nib longitudinally along the at least one side surface of the electronic device cover glass substrate.

5. The method of claim 3, wherein:
the electronic device cover glass substrate further comprises a first chamfer surface between the at least one side surface and the front surface and a second chamfer surface between the at least one side surface and the back surface; and
the nib further comprises a protrusion coupled to the body, the protrusion having a shape that corresponds to a shape of the second chamfer surface.

6. The method of claim 3, wherein:
the electronic device cover glass substrate further comprises a first chamfer surface between the at least one side surface and the front surface and a second chamfer surface between the at least one side surface and the back surface; and
the nib further comprises an indentation coupled to the body, the indentation having a shape that corresponds to a shape of the first chamfer surface or the second chamfer surface.

7. The method of claim 1, wherein:
the pigment comprises a carbon black material;
the curable ink further comprises a resin, a catalyst, an adhesion promoter, and a solvent; and
the curable ink is curable via heat.

8. The method of claim 7, wherein:
the solvent is formulated to evaporate when the layer of the curable ink is deposited on the at least one side surface of the electronic device cover glass substrate; and
the nib comprises a material that is resistant to the solvent.

9. The method of claim 1, wherein the pigment comprises a carbon black material, the method further comprising:
passing a particle of the pigment longitudinally through the fiber bundle.

10. The method of claim 1, wherein:
the pigment comprises a carbon black material and a mean width of particles of the pigment is less than a mean width of a passage through the fiber bundle.

11. The method of claim 1, further comprising:
curing the curable ink via ultraviolet light.

12. The method of claim 1, wherein:
a mean width of particles of the pigment is between 0.1 microns and 30 microns.

13. The method of claim 1, wherein:
the thickness of the electronic device cover glass substrate is 0.8 millimeters or less.

14. The method of claim 1, wherein:
the pigment comprises a material having a color that corresponds to the color of an opaque mask of the electronic device cover glass substrate.

15. The method of claim 1, wherein:
the optical density of the layer of the curable ink with respect to visible light is 3.5 or greater.

16. The method of claim 1, wherein the layer of the curable ink on the at least one side surface is effective to reduce leakage of light generated by a light source of the electronic device through the at least one side surface.

17. A method of manufacturing, comprising:
providing an electronic device cover glass substrate comprising a front surface, a back surface opposing the front surface, and at least one side surface between the front surface and the back surface, the at least one side surface having a first side surface end and a second side surface end longitudinally opposed to the first side surface end;
positioning a pen at the first side surface end, the pen comprising:
a reservoir containing an ink comprising a pigment; and
a nib in fluid communication with the reservoir, the nib comprising a fiber bundle that permits the pigment to pass through the nib;
moving the pen in a longitudinal direction towards the second side surface end; and
depositing a layer of the ink on the at least one side surface.

18. The method of claim 17, further comprising:
delivering to the reservoir a first composition comprising a resin and a second composition comprising a catalyst, where in the resin is configured to react to the catalyst.

19. The method of claim 17, further comprising:
preparing the ink with a formulation of a resin having a pigment, an adhesion promoter, a curing catalyst, and a solvent.

20. The method of claim 17, further comprising:
agitating the ink contained in the reservoir, wherein the reservoir includes a ball.

21. The method of claim 17, further comprising:
actuating a valve of the pen to prime the nib with a volume of ink, wherein the volume of ink is released from the reservoir via the valve, the valve being in fluid communication with the reservoir and the nib.

22. The method of claim 1, further comprising:
passing a particle of the pigment between fibers of the fiber bundle.

* * * * *